Feb. 3, 1925.
A. J. BORTS
PARTITION FOR FILES
Filed April 17, 1923
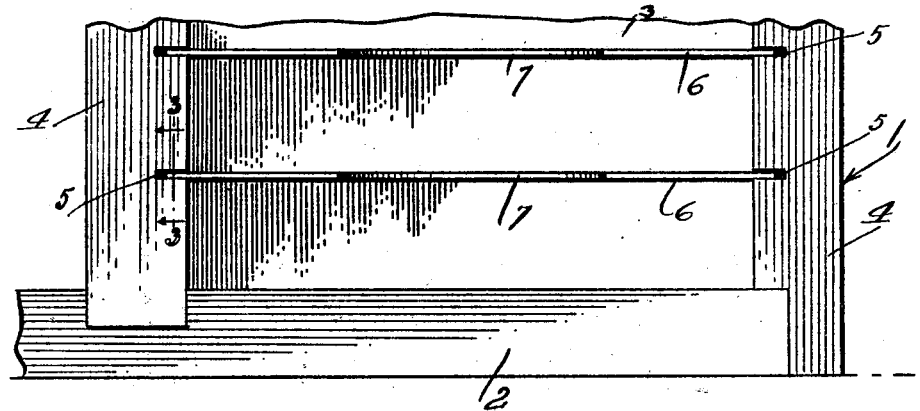
Fig. 1.
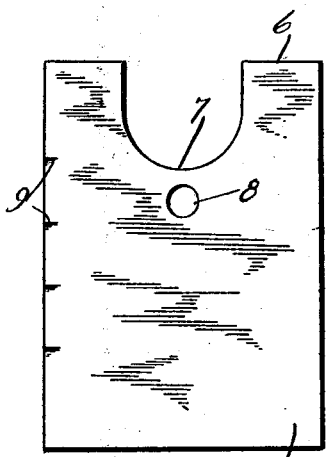
Fig. 2.
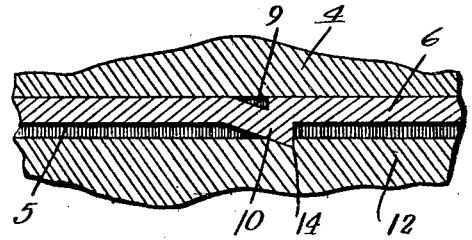
Fig. 3.
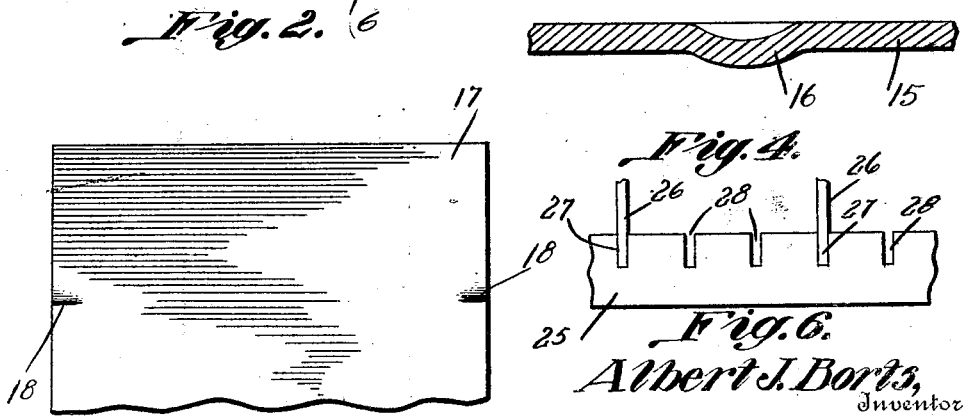
Fig. 5.    Fig. 4.    Fig. 6.
Albert J. Borts,
Inventor.
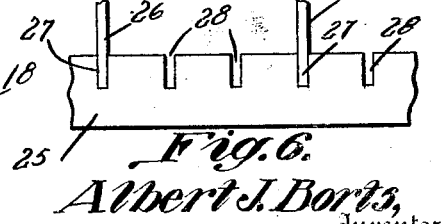
Attorneys Patented Feb. 3, 1925.

1,525,219

UNITED STATES PATENT OFFICE.

ALBERT J. BORTS, OF IOWA CITY, IOWA.

PARTITION FOR FILES.

Application filed April 17, 1923. Serial No. 632,741.

*To all whom it may concern:*

Be it known that I, ALBERT J. BORTS, a citizen of the United States, residing at Iowa City, in the county of Johnson and State of Iowa, have invented a new and useful Partition for Files, of which the following is a specification.

This invention aims to provide novel means for holding a partition in a receptacle of any sort, such as a desk or filing cabinet. A further object of the invention is to improve generally and to enhance the utility of devices of that type to which the invention appertains.

In the drawings:—

Figure 1 shows in elevation, a receptacle equipped with the device forming the subject matter of this application; Figure 2 is a plan showing one of the partitions; Figure 3 is a section on the line 3—3 of Figure 2; Figure 4 is a section showing the modified partition; Figure 5 is a plan showing a further modification in the partition; and Figure 6 is an elevation showing a slight modification in the invention.

The numeral 1 marks a receptacle which may be a filing cabinet, a portion of a desk, or anything else, the receptacle including a base 2 and perhaps a back 3, the walls of the receptacle being marked by the numeral 4 and being provided upon their inner surfaces with guides 5 preferably in the form of slots, which may be in the form of slots, which may be mere saw cuts.

Partitions 6 are supplied, and may be made of metal, the partitions being mounted in the guides 5. Each partition 6 is supplied at its outer end with a notch 7 adapted to receive the thumb of an operator, there being an opening 8 in the partition, at the base of the notch 7, through which the thumb and fore-finger of the operator may meet, to facilitate a with-drawal of the partition 6.

Along one edge, the partition 6 is distorted as indicated at 9 in Figure 2 to form transverse ribs 10, spaced apart longitudinally of the partition and extended inwardly but a short distance, transversely of the partition, each rib 10, thus formed, including an inclined surface 11 and a surface 12 disposed substantially at right angles to the partition, a biting edge 14 thus being formed. The walls 4 of the receptacle 1 are made of wood, the wood will yield enough to permit the partitions 6 to be inserted into the guides 5, the inclined surfaces 11 of the ribs 10 riding along the longitudinal surfaces of the guides 5. When, however, an attempt is made to withdraw the partitions 6, and, under the weight of the material on the partitions, the edges 14 of the ribs 10 will bite into the constituent material of the walls 4, as shown in Figure 3, the partitions 6 being held in place securely but removably. There is an advantage in forming the ribs 10 along one edge only of the partition 6, as shown in Figure 2. If the guide slot 5 in one wall 4 becomes worn and enlarged, due to repeated withdrawals of the partition 6, the partition 6 may be reversed or turned up-side down, the ribs 10 then cooperating with the guide slot 5 in the opposite wall, this guide slot not having been worn, because the partition 6 has one plain edge.

In the event that the walls 4 are made of metal, then recourse may be had to the partition 15 shown in Figure 4, the ribs being concaved, as at 16, and being slightly resilient, there being no occasion for the biting edge shown at 14 in Figure 3.

If desired, the partition 17 of Figure 5 may be used, the partition being provided on both edges, as at 18, with ribs such as the ribs 10 or 16.

In Figure 6, the receptacle or cabinet is marked by the numeral 25, and the notches which receive the partitions 26 are marked by the numeral 27. The cabinet is provided with any desired number of intermediate notches 28, permitting the size of the compartments to be varied. Figure 6, also, will make it manifest that the partitions may be disposed vertically as well as horizontally as depicted in Figure 1.

What is claimed is:

The combination with a receptacle having guides, of a partition plate slidable in the guides, the partition plate being provided along one of its edges, only, with a rib outstanding from the plane defined by the plate and cooperating with one wall of one guide to press the partition plate against the opposite walls of both guides, the opposite edge of the partition plate being plain and the partition plate being reversible to cause the rib thereof to coact with said other guide when the first specified guide has become worn by the action of the rib.

In testimony that I claim the foregoing as my own, I have hereunto affixed my signature in the presence of two witnesses.

ALBERT J. BORTS.

Witnesses:
J. C. STOUFFER,
ELLA M. STOUFFER.